(12) United States Patent
Pridoehl et al.

(10) Patent No.: US 9,193,110 B2
(45) Date of Patent: Nov. 24, 2015

(54) USE AND PRODUCTION OF COATED FILAMENTS FOR EXTRUSION-BASED 3D PRINTING PROCESSES

(71) Applicants: Markus Pridoehl, Grosskrotzenburg (DE); Ulrike Behrens, Hanau (DE); Stefan Bernhardt, Offenbach (DE); Ann-Kristin Klaar, Gruendau (DE); Samuel von Karsa-Wilberforce, Hanau (DE)

(72) Inventors: Markus Pridoehl, Grosskrotzenburg (DE); Ulrike Behrens, Hanau (DE); Stefan Bernhardt, Offenbach (DE); Ann-Kristin Klaar, Gruendau (DE); Samuel von Karsa-Wilberforce, Hanau (DE)

(73) Assignee: Evonik Industries AG, Essen (DE)

( * ) Notice: Subject to any disclaimer, the term of this patent is extended or adjusted under 35 U.S.C. 154(b) by 44 days.

(21) Appl. No.: 14/073,098

(22) Filed: Nov. 6, 2013

(65) Prior Publication Data

US 2014/0134335 A1    May 15, 2014

(30) Foreign Application Priority Data

Nov. 9, 2012   (EP) ..................... 12192053

(51) Int. Cl.
 B29C 47/00 (2006.01)
 B29C 47/36 (2006.01)
 B29C 67/00 (2006.01)

(52) U.S. Cl.
 CPC ......... B29C 67/0055 (2013.01); B29C 67/0085 (2013.01); *Y10T 428/2933* (2015.01)

(58) Field of Classification Search
 None
 See application file for complete search history.

(56) References Cited

U.S. PATENT DOCUMENTS

| | | | | |
|---|---|---|---|---|
| 3,061,576 A * | 10/1962 | Roth et al. | ..................... | 523/205 |
| 5,121,329 A | 6/1992 | Crump | | |
| 5,967,044 A * | 10/1999 | Marschke | ..................... | 101/363 |
| 6,129,872 A | 10/2000 | Jang | | |
| 6,165,406 A | 12/2000 | Jang et al. | | |
| 6,401,002 B1 | 6/2002 | Jang et al. | | |
| 6,713,125 B1 | 3/2004 | Sherwood et al. | | |
| 7,648,664 B2 | 1/2010 | Teal et al. | | |
| 2002/0111707 A1 | 8/2002 | Li et al. | | |
| 2003/0056870 A1* | 3/2003 | Comb et al. | ..................... | 156/64 |
| 2004/0251574 A1 | 12/2004 | Collins et al. | | |
| 2007/0182055 A1* | 8/2007 | Eells et al. | ..................... | 264/148 |
| 2009/0074826 A1* | 3/2009 | Naik | ..................... | 424/404 |
| 2010/0037971 A1* | 2/2010 | Scherer et al. | ..................... | 138/110 |
| 2010/0096485 A1* | 4/2010 | Taatjes et al. | ..................... | 242/171 |
| 2010/0327479 A1 | 12/2010 | Zinniel et al. | | |
| 2011/0024043 A1* | 2/2011 | Boock et al. | ..................... | 156/345.24 |
| 2013/0328228 A1* | 12/2013 | Pettis et al. | ..................... | 264/40.1 |
| 2014/0088751 A1* | 3/2014 | Pridoehl et al. | ..................... | 700/119 |

FOREIGN PATENT DOCUMENTS

| | | | | |
|---|---|---|---|---|
| EP | 1 432 566 B1 | 6/2004 | | |
| EP | 1 475 220 A2 | 11/2004 | | |
| EP | 1 491 322 B1 | 12/2004 | | |
| EP | 1 558 440 B1 | 8/2005 | | |
| GB | 2419679 A | 5/2006 | | |
| JP | 2000248072 A * | 9/2000 | ................. | C08J 3/20 |
| WO | WO 01/26023 A1 | 4/2001 | | |
| WO | WO 2008/075450 A1 | 6/2008 | | |
| WO | WO 2008/077850 A2 | 7/2008 | | |
| WO | WO 2009/139395 A1 | 11/2009 | | |

OTHER PUBLICATIONS

Evans, Practical 3D Printers, Apress, 1st Ed, (Aug. 29, 2012), pp. 1-6 and 20-22.*
U.S. Appl. No. 14/116,244, filed Nov. 7, 2013, Pridoehl, et al.
U.S. Appl. No. 14/116,515, filed Nov. 8, 2013, Pridoehl, et al.
Author: theorbtwo, Marker holder (for colouring feedstock), 1 page, Jan. 13, 2011, Thingiverse.com.
Author: cyclone, Filament Colorizer—Marker Holder, 1 page, Sep. 20, 2011, Thingverse.com.

* cited by examiner

*Primary Examiner* — Lisha Jiang
(74) *Attorney, Agent, or Firm* — Oblon, McClelland, Maier & Neustadt, L.L.P.

(57) ABSTRACT

The present invention relates to a novel process for the production of coated filaments for subsequent application as print in extrusion-based 3D printers, e.g. FDM printers (fused deposition modelling printers). The filaments are coated in a separate process outside of the printer, and can also be used in a conventional extrusion printer. The present invention further relates to the coating device for application of the coating to the filament and to a roll containing the coated filaments.

13 Claims, No Drawings

USE AND PRODUCTION OF COATED FILAMENTS FOR EXTRUSION-BASED 3D PRINTING PROCESSES

CROSS REFERENCE TO RELATED APPLICATIONS

This application claims priority to European Application No. 12192053.2, filed Nov. 9, 2012, the disclosure of which is incorporated herein by reference in its entirety.

BACKGROUND OF THE INVENTION

The present invention relates to a novel process for the production of coated filaments for subsequent application as print in extrusion-based 3D printers, e.g. FDM printers (fused-deposition-modelling printers). The filaments according to the invention are coated in a separate process outside of the printer, and may be used in an appropriate unmodified conventional extrusion printer. The present invention further relates to the coating device for the conduct of the said process and to rolls with coated filaments.

Rapid prototyping or rapid manufacturing processes are manufacturing processes which aim to convert available three-dimensional CAD data directly and rapidly into workpieces, as far as possible without manual intervention or use of moulds.

The scope of rapid prototyping processes has grown to include a variety of processes. These can be divided into two groups: laser-based processes and processes without use of a laser.

The best-known laser-based 3D printing process, which is at the same time the oldest, is stereolithography (SLA). In this process, a liquid composition of a radiation-curable polymer is hardened layer-by-layer by using a laser. The person skilled in the art can clearly see that the only possibility with a workpiece produced by this method is subsequent coloring on the surface. This is complicated and time-consuming.

A similar process is Selective Laser Sintering (SLS), in which, by analogy with the SLA, a pulverulent raw material, e.g. a thermoplastic or a sinterable metal, is sintered selectively layer-by-layer by a laser. Again, the first step of this process can only produce single-color, or non-specifically colored, 3D objects. The same applies to the third laser-based process, "laminated object manufacturing", in which layers of a paper web or plastics foil provided with adhesive are adhesively bonded to one another and cut by a laser. The subsequent coloring of an object is described for example in U.S. Pat. No. 6,713,125.

A conventional 3D printing process which can also be used for the production of multicolored objects is the UV ink-jet process. In this three-stage process, a pulverulent material is applied in thin layers, a UV-curable liquid is printed in the form of the respective layer of the subsequent three-dimensional product onto the said layers, and finally the printed layer is hardened by using a UV source. These steps are repeated layer-by-layer.

In EP 1 475 220, variously colored liquids are provided with hardener, and in WO 2008/077850 are also mixed in a chamber directly upstream of the printing process. Selective coloring is thus possible. However, no sharp color transitions are possible, because of the mixing chamber. This type of process moreover lacks sharpness at the limits of the hardening process, and this can reduce surface smoothness, and can sometimes lead to non-uniform coloring. In WO 01/26023, two printing heads are described with variously colored hardener compositions, giving different elasticity properties in the product parts. However, the number of colors described is not more than two.

WO 2008/075450 describes a variant in which radiant heat, instead of UV light, is used for hardening and variously colored hardener compositions are similarly used.

GB 2419679 discloses a process in which variously colored polymer particles can be applied selectively and can be hardened at various wavelengths. This process is extremely complicated, and leads to color definition that lacks sharpness.

In a process in accordance with WO 2009/139395, similar to 3D ink jet printing, a colored liquid is applied layer-by-layer and printed selectively with a second liquid which leads to a curing reaction with the first liquid. This type of process can only produce a structure of layer-by-layer colors, except in so far as mixing can occur between the uncured layers of liquid.

Another process is Three-Dimensional Printing (TDP). In this process, by analogy with the ink jet process, pulverulent materials, which preferably however involve ceramics, are saturated selectively layer-by-layer with the melt of a thermoplastic polymer. After each print layer, a fresh layer of the pulverulent material must be applied. Solidification of the thermoplastic forms the three-dimensional object.

In the process described in US 2004/0251574, the print of the thermoplastic is followed by selective printing with an ink. This process has the advantage of permitting highly selective printing. However, this process has the disadvantage that it is impossible to achieve uniform color definition or bright coloring, since there is no possibility of achieving uniform penetration of the ink into the composite made of the (ceramic) powder and of the binder.

In the process described in EP 1 491 322, two different materials are printed. The first comprises the binder and a colorant which is precipitated on contact with the second material and thus colors the surface selectively. It is thus possible to produce better color properties on the surface of the object. However, there are problems with the uniform mixing of the two materials and with the complicated two-stage process. There is no description of how, or whether, it is possible to ensure that good color definition is achieved with a multicolor print.

In U.S. Pat. No. 6,401,002, various liquids are used with different inks and the binder. The said liquids are either applied separately dropwise or combined by way of connecting lines in a nozzle upstream of the dropwise application process. The person skilled in the art is aware that neither procedure gives ideal color definition. In the former, the mixing of the inks takes place in viscous liquids on the surface. This mixing is therefore rarely complete. In the second procedure, pressure differences in the connecting lines can lead to extreme color variations.

Among printing processes for the production of three-dimensional objects, the process that is most economical in use of materials and that is also most advantageous in terms of design of machinery is the fused-deposition-modelling (FDM) process. This involves an extrusion-based, digital manufacturing system. There are also other known processes that are substantially analogous with slight differences, for example fused filament fabrication (FFM), melted extrusion manufacturing (MEM) or selective deposition modelling (SDM).

In the FDM method, two different polymer filaments are melted in a nozzle and are printed selectively. One of the materials involves a support material which is needed only at locations above which for example an overhanging part of the 3D object is subsequently printed and requires support during the printing procedure. The said support material can be removed subsequently, e.g. via dissolution in acids, bases or water. The other material (the build material) forms the actual 3D object. Here again, the print is generally achieved layer-by-layer. The FDM process was first described in U.S. Pat. No. 5,121,329. Coloring is mentioned in general terms in US 2002/0111707, but is not described in any detail.

In the process described in EP 1 558 440, the individual layers are color-printed in a subsequent step. This process is slow, and printing of the thermoplastics that are already curing leads to poorly resolved color definition.

In the 3D color-printing method in accordance with U.S. Pat. No. 6,165,406, separate nozzles are used for each individual color. There are therefore only very restricted possibilities for color mixing, and the color effect achieved becomes very simple.

In the FDM variant described in U.S. Pat. No. 7,648,664, variously colored build materials are used in granulate form, melted separately from one another, and mixed with one another in accordance with color requirement in an intervening extruder, before application as print. This method requires very complicated apparatus, and many advantages of FDM are lost.

In a very similar system according to EP 1 432 566, the mixing of the molten granulates is achieved directly in the heated printing head before these are directly applied as print. The said mixing can certainly not be complete, and the quality of print representation is correspondingly poor. Another disadvantage of this method is moreover that granulates or powders must be used and that these require separate storage and melting in the machine.

U.S. Pat. No. 6,129,872 describes a process in which the build material is melted in a nozzle and various colorant mixtures are metered selectively into the melt at the end of the nozzle. However, this leads to inadequate mixing and does not give clean color definition.

US 2010/0327479 describes a process in which a plurality of colored filaments are combined in a microextruder and are continuously extruded therein to give a new colored filament, which is then passed onward into the printing head for application as print. This process requires very sophisticated and complicated apparatus. The achievable color range is moreover subject to restriction resulting from the number of filaments. In an alternative embodiment, the variously colored filaments can also be conducted directly into the printing head, and mixed there. However, this variant also exhibits the disadvantages described.

All of the processes described above disclose exclusively techniques in which either the matrix of the material itself has been coloured or else an in-line coating process is used—by using an extrusion-based 3D printing process, e.g. the FDM 3D printing process. However, in-line coating has the disadvantage of requiring specific 3D printers with a corresponding in-line coating system. On the other hand, colored matrix material, or matrix material provided with additives, has the disadvantage of requiring use of unnecessarily large amounts of dye, pigment or additive to achieve a good result.

It was therefore an object of the present invention to provide filaments for a 3D printing process which, by using small amounts of dye, pigment and/or additive, can produce three-dimensional objects which include colors and/or additives.

Another object of the present invention was to provide, for use in extrusion-based 3D printers, filaments which contain colors and/or additives, without any need for production of a plastics masterbatch which involves corresponding colors and/or additives. Another object was to provide, for use in extrusion-based 3D printers, filaments which contain colors and/or additives, where the said printers do not require any modification, for example a coating unit.

Another object was to provide filaments for an advantageous and rapid 3D printing process for the printing of mechanically stable, multicolored objects.

Another object was to permit provision of objects which include colors and/or additives, where the introduction of the color and/or additives is not to be postponed to a downstream operation.

Other problems addressed are not explicitly mentioned but are apparent from the entire context of the description, claims and examples below.

SUMMARY OF THE INVENTION

These and other objects have been achieved according to the present invention, the first embodiment of which includes a process for extrusion-based 3D printing, the process comprising: applying a coating composition to a filament to obtain a coated filament; fixing the coating on the filament; conveying the fixed coated filament to a printing head; melting the filament in the printing head; and extruding the melted coated filament onto a substrate to form a three dimensional object; wherein the coating composition comprises at least one selected from the group consisting of an additive, a pigment and an ink.

In a further embodiment of the present invention, the coating is conducted in a coating unit in which the filament is coated with the coating composition, components of the coating composition are supplied to the coating unit from feed containers equipped with metering devices, and the coated filament is fixed in a fixing unit downstream of the coating unit before being conveyed to the printing head.

In a second embodiment of the present invention the coating composition may be produced from individual components in a mixer to obtain a coating composition mixture; and then the mixture is passed to the coating unit.

According to other embodiments the filament comprises a thermoplastically processable material or may comprise an acid-, base- or water-soluble polymer, wherein the filament comprising the acid-, base- or water-soluble polymer is a support material in the three dimensional object.

One of ordinary skill will readily recognize that various permutations and adaptations of the present invention are possible and such modification, although not explicitly described in the following description and claims, is embodied in the present invention.

DETAILED DESCRIPTION OF THE PREFERRED EMBODIMENTS

The present invention provides a process for the production of coated filaments for use in an extrusion 3D printing process, and also a device for the coating of the filaments, and rolls of the coated filaments.

According to the present invention, simple modification of filaments with resultant appropriate change to, or improvement in, for example, their electrical or thermal conductivity, their spectral absorption, IR absorption or UV absorption, optical properties, gloss, haptic properties, adhesion properties, wetting properties, water adsorption, mechanical properties, reactivity and interlayer adhesion may be achieved. The process according to the present invention provides for an efficient production of print filaments which exhibit an additional benefit in use, extending beyond the properties of the polymeric material. In particular, the present invention is an efficient process which does not coat the entire polymer but instead specifically coats the surface of the ingoing polymeric filament and also of the printed component.

The expression extrusion 3D printing process in particular means a fused-deposition-modelling process (hereinafter abbreviated to FDM) or printing processes very similar to the FDM process. The text below uses the following expressions synonymously: extrusion-based 3D printing process, FDM printing process and FDM 3D printing process. The expressions extrusion-based 3D printer and FDM 3D printer, and FDM printer, are also used synonymously hereinafter.

The design of an FDM 3D printer, and the relevant process parameters, may be found in U.S. Pat. No. 5,121,329 and US 2010/0327479. In relation to the present invention, the person skilled in the art can easily make appropriate use of these parameters for other extrusion-based 3D printing processes, without any major cost.

For the purposes of this invention, the term composition means the composition which according to the invention is applied to the polymer strand. The composition may comprise inks, pigments and/or additives.

Throughout this description all ranges described include all values and sub-ranges therein, unless otherwise specified.

Additionally, the indefinite article "a" or "an" carries the meaning of "one or more" throughout the description, unless otherwise specified.

For the purposes of this invention, the term fixing means the drying, hardening, polymerization, crosslinking, binding, or addition reaction or other reaction of the coating.

For the purposes of the present invention, the term filament means the unprocessed form of the build materials or of the support materials in the form of a strand. According to the invention, the said filament is melted in the printing head and is then applied as print to give a 3D object. The filament contains a thermoplastically processable material. The filament may generally be a polymer filament, but is not restricted thereto. It may also be possible that polymer filaments are composed only to some extent of a thermoplastically polymeric matrix material, and are also composed of fillers or, for example, metals.

For the purposes of this invention, the term printing head means the entire device for the conveying, melting and application of a filament in an extrusion-based 3D printing process.

The problems were solved via provision of a novel extrusion-based 3D printing process for the production of single- or multicolored, three-dimensional objects from filaments. In this process, the filaments used are precoated with a coating composition composed of additives and/or pigments and/or inks. The filaments thus coated can then be used in an extrusion-based 3D printer.

According to the first embodiment the process for extrusion-based 3D printing, comprises: applying a coating composition to a filament to obtain a coated filament; fixing the coating on the filament; conveying the fixed coated filament to a printing head; melting the filament in the printing head; and extruding the melted coated filament onto a substrate to form a three dimensional object; wherein the coating composition comprises at least one selected from the group consisting of an additive, a pigment and an ink.

Downstream of the extrusion process in the subsequent extrusion-based 3D printing process, the coating thus applied to the filaments in essence remains on the surface of the printed strands, i.e. on the surface of the component. This may provide advantages such as saving of material and the avoidance of adverse effects on the matrix material. In particular, it may thus be possible to efficiently produce components in any desired color and/or with improved interlayer adhesion and surface properties with particularly low consumption of additives and of colorant, without any effect on the polymer matrix. It is thus easily possible to achieve immediate provision of filaments with any desired colors, in particular with colors which comply with the requirements for the subsequent print, without any need for the ordering, production, delivery, storage and quality control of corresponding plastics masterbatches. The claimed process moreover permits application of coated filaments as print without any requirement for additional modification of the printer used for this purpose. It may thus be also possible according to the present invention to produce components in any desired color and/or with additional properties by using extrusion-based 3D printers not equipped for multicolor print.

In a preferred embodiment that the coating process takes place in a coating unit in which the filament is coated with a coating composition, the components of which are provided from one or more feed containers. The feed containers may be equipped with metering devices. The coated filament may be fixed in a fixing unit downstream of the coating unit.

The present invention also provides a device for the coating of this type of filament, in particular of the build material, having a coating unit.

The coating unit by means of which the claimed process may be implemented can involve an arrangement with one or more nozzles, preferably, with one or more ink-jet printing heads. In an alternative embodiment, a sponge-like material which surrounds the filament and which has been saturated with the coating composition may be employed. Further, an annular gap of minimal dimension to which varying mixtures of colorant or of additives are continuously charged may be employed. The coating unit may moreover involve an extruder, e.g. in the form of a microextruder. In relation to the said extruder, there are in turn two variants. Firstly, the extruder can produce a melt of the coating composition, which is conducted onto the solid filament. However, a second variant is also conceivable, according to which the coating process takes the form of a coextrusion process during the production of the filament.

At the location where the filament leaves the coating unit, there may preferably be a restriction by means of which the thickness of coating on the filament is adjusted appropriately for the design of the printing head. The coating unit should moreover have an outlet for excess coating compositions and for cleaning procedures. Care must be taken that the composition introduced into the coating unit, or the coating stripped by the restriction, does not in turn simply escape by way of the outlet, but instead there is a specific control system to reduce materials usage. There should moreover be a collection container provided to the outlet in order to collect the said residues.

The fixing unit may be a thermal drying unit, such as, for example, a source of IR radiation, and/or may be an optionally temperature-controlled jet of air or gas. The previously coated filament is passed through the said unit, and volatile constituents are removed in the drying unit. It may thus be possible to avoid subsequent running of undried inks. It may moreover be possible to avoid the problem of evolution of gas from volatile constituents in the nozzle during the print process, which can in turn lead to formation of bubbles or to imprecise print.

Care should preferably also be taken at this point to collect volatile constituents Released—for example solvents—or to conduct these away without causing harm.

As an alternative to the thermal drying unit, it may also be possible to carry out air-drying prior to entry of the coated filament. For this, the coated filament must pass through at least a section measuring 1 cm, preferably measuring at least 10 cm, particularly preferably measuring at least 15 cm and with particular preference measuring at least 25 cm after leaving the coating unit and prior to any further process step such as the optional wind-up onto a roll. In one preferred embodiment, the coating unit and the said downstream section are within a heated housing. This design additionally accelerates the air-drying process. In this design it is preferable that care is taken to provide adequate ventilation of the interior of the housing, and that care is taken that volatile constituents are conducted away without causing harm.

The fixing of the coating may also be achieved or accelerated through a chemical reaction such as polymerization, an addition reaction or crosslinking, instead of or in addition to the drying process.

In a simplest example of this embodiment, the coating applied may be a reactive mixture which under ambient conditions reacts spontaneously and is thus fixed. For this, the coated filament must pass through at least a section measuring 1 cm, preferably measuring at least 10 cm, particularly preferably measuring at least 15 cm and with particular preference measuring at least 25 cm after leaving the coating unit.

In an alternative embodiment, the fixing of the coating may also be achieved or accelerated by plasma, UV radiation, microwave radiation, magnetic induction or cold plasma. The length of the fixing section may thus be markedly reduced.

When a reactive coating is employed, the coating may be incompletely fixed upstream of further processing and further fixing may then take place downstream of the extrusion procedure during use in the extrusion-based 3D printer, again by UV radiation, microwave radiation, magnetic induction or a plasma. According to this embodiment interlayer adhesion may be improved.

Because of the relatively low shear rates within the printing head, and the appropriately adjusted viscosities of polymer and coating at the selected extrusion temperature, very little mixing of the coating with the filament occurs during extrusion in the print nozzle, as long as the print head has not been equipped with a mixing device, e.g. a static mixing device.

Use of the filaments produced by the claimed process thus gives a component composed of predominantly surface-colored or -coated strands. This process therefore saves material when comparison is made with a bulk-colored polymer matrix. This method moreover applies additives, in particular adhesion promoters, precisely where these are needed in order to increase the stability of the 3D object downstream of the extrusion process.

In one optional embodiment, it may be possible, upstream of the coating process, to produce the coating composition from the individual components in a mixer, before the coating composition is passed onwards into the coating unit. The said mixer may be a dynamic mixer, or preferably a static mixer. Various additives, pigments and/or inks are first introduced into the said mixer. The mixture produced in the mixer is then passed onwards into the coating unit.

In one preferred embodiment, the mixer may be attached directly on the coating unit or may form an integral unit therewith, in order to minimize dead volume, pressure losses and the extent of connecting lines. The mixture of inks, pigments and/or additives is applied to the surface of the solid filament. During subsequent use in a printer, in particular during the extrusion process in the printing head, partial mixing of the coating with the molten main filament may occur through diffusion in the melt. As previously described however, homogeneous distribution in the melt is not necessary, since the subsequent surface of the three-dimensional object is composed predominantly and advantageously of the coating introduced, which forms the surface of the melt strand. According to the process of the present invention it may be possible to produce highly colored objects with relatively low colorant consumption, or gives a markedly more intense color shade when the surface is coated with the same amount of colorant employed in conventional methods.

Corresponding considerations also apply to additives, especially those intended to improve adhesion between the individual layers in the three-dimensional object. These are needed only on the surface of the melt strand.

In another embodiment of the present invention, downstream of the fixing process, the coated filament may be wound up onto a roll by a winder. The said wound-up roll can be stored and applied subsequently as print in any conventional extrusion-based 3D printer for the application of filaments as print.

The arrangement of the optional winder, of the coating unit, of the fixing unit and of the other components may be selected relatively freely, requiring compliance according to the invention only in relation to the sequence. It may therefore optionally also be possible that the filaments pass through the coating unit and/or the fixing unit horizontally or upwards. Deflector rolls may be used to achieve changes of direction prior to entry into the winder.

As an alternative to deflector rolls, it may also be possible to pass the filament through a flexible tube. This variant may have the advantage that the process may be more reliable. In contrast, a deflector roll has the advantage of higher filament tension.

The filament may be conveyed by a conventional mechanism, generally involving two conveying rolls and a motor driving these, where one or both rolls can be driven. In particular, the optional winder can serve simultaneously for conveying. As an alternative, or else in particular in addition, there may be a further conveying unit directly behind the fixing unit and preferably upstream of an optional deflector roll or of a flexible guide tube. There may be a further conveying unit—with its own motor and independently controllable—directly behind the filament roll on which the unprocessed filament is provided, and upstream of the coating unit.

In one embodiment of such variations, directly upstream of the coating unit, there may be a guide system or a brake, e.g. in the form of one or two braking rolls, which reliably provide tensioning of the filament in the coating unit. A second conveying unit or a second guide system directly behind the fixing unit that follows the coating unit may then be included, or a second conveying unit or a second guide system downstream of the minimal section measuring 1 cm necessary for the drying process may be present.

The device used for the claimed process may also have other optional added components. The following list provides examples and is not to be interpreted as exclusive:

Methods such as plasma discharge may optionally be used upstream of the coating unit to activate the unprocessed filament in order to improve adhesion.

The arrangement may moreover optionally have, upstream of or behind the fixing unit, color detectors and/or sensors for determining the diameter of the filament or the thickness of the ingoing filament and of the coated filament. Information from these can be used to optimize the flow of materials, and for color monitoring and print control.

The colorants used in the device involve compositions of various colorants, for example involving three primary colors, an example being the subtractive mixing of magenta, cyan and blue and, respectively, yellow, or the additive mixing of the constituent colors red, green and blue of light. When three primary colors are used, black may also be added as fourth "color" thereto. Another alternative may be the use of white as fourth or fifth "color", where appropriate for the build material. However, some "true-color" systems may also require up to twenty colors. In preferred embodiments, systems using at least 10, in particular 12, different colors may be employed. This type of system may achieve greater brilliance of color.

The differently constituted color systems described are conventionally known to the person skilled in the art from 2D printing. Each of the colorants used may be provided in a separate feed container equipped with its own metering device, and is metered directly therefrom, as required by the embodiment, into the coating unit or the dynamic mixer.

The additives may preferably comprise one or more adhesion-improving additives. Additives may comprise those activatable by microwaves, heat, plasma, UV light or magnetic fields. As an alternative, or in addition, additives included may also be, for example, UV-crosslinking agents or thermally or magnetically activatable adhesives, or adhesion promoters. In another embodiment, additives to improve haptic properties, coating constituents that are dirt-repellent and/or that improve scratch resistance, or additives for surface stabilization, e.g. UV stabilizers may be employed. Additives for improving thermal conductivity and/or electrical conductivity, or antistatic agents, may also be employed for industrial applications. A coating composition that comprises additives may be colorless.

It may also be possible to apply inorganic additives in order to reduce the flammability of the 3D object, or in order to improve thermal properties, surface conductivity and/or haptic properties, an example being silicon oxide, aluminium oxide or—in the case of dark-colored objects—carbon black as additive on the surface. Other additives that may be used include CNT (Carbon Nanotubes) and MWCNT (Multiwall Carbon Nanotubes). The respective effect of including such additives according to the present invention may be more effective than when the corresponding additives have been added to the matrix of the material.

Graphene may be used as additive in particular in order to improve the thermal and electrical conductivity of the surface.

The additives may be provided from separate feed containers or in a mixture with one or more colorants. The method by which the respective build material and/or support material is coated with the said additives is such that even after melting in the nozzle they are preferably present at the surface of the extruded strands during the subsequent use as print, and at that location achieve their effect, for example adhesion-improving properties of the strands with respect to one another, or surface conductivity.

According to preferred embodiments, the build materials comprise thermoplastically processable material. Examples of suitable thermoplastically materials include acrylonitrile-butadiene-styrene terpolymer (ABS), polycarbonate (PC), poly(meth)acrylate, polyphenylene sulphone (PPSU), high density polyethylene HDPE, polyetherimide (PEI), polyether ether ketone (PEEK), polylactic acid (PLA) or a mixture of at least two of the said polymers, or a mixture composed of at least 50% by weight of one of these polymers mentioned. The term (meth)acrylate here means either methacrylate, e.g. methyl methacrylate, ethyl methacrylate, etc., or acrylates, e.g. ethylhexyl acrylate, ethyl acrylate, etc., or else a mixture of the two.

The process according to the present invention employs not only filaments which are subsequently used as build material but also coating of filaments which can be used as support material in an extrusion-based 3D printer. In the case of support filaments, coating with additives may be more important than coating with inks or pigments. The support filaments generally comprise acid-, base- or water-soluble polymers.

The respective color shade may be input into a CAD program, and a file may be provided which comprises, in addition to the coordinates, the color information for the manufacturing process and for the regulation of the formulation of materials and of inks. An example of a suitable file format is described in the Additive Manufacturing File Format (ASTM F2915-12). The respective color shade is established in this format through regulation of the metering devices and controlled metering of the respective additives, primary colors and, respectively, black from the feed containers into the system.

The feed containers may also comprise additives, adhesion promoters or adhesives which can be activated and/or can be heated by microwaves or by magnetic or electric fields. These may be added either to one composition or to all the compositions, or may be added from separate feed containers. In the latter case, the said compositions are colorless. The person skilled in the art arrives at the specific selection of the appropriate additives by considering the composition and the build material used.

One or more feed container(s) may moreover also comprise crosslinking agents, initiators or accelerators which through contact with the filament, through reaction with one another in the mixture, or through thermal or other activation of the reaction in the fixing unit and/or downstream of the extrusion process, lead to a reaction, for example addition reaction or crosslinking, thus giving a three-dimensional object that is entirely or to some extent an elastomeric or thermoset material. Materials such as, for example, air- or water-curing coatings, particular preference being given here to water-curing coatings may be employed. In this case, if the intention is that no hardening occurs until the printing process, care must be taken that the coated filaments are stored under dry conditions and/or with exclusion of air before they are used in an extrusion-based 3D printer.

When the coated strands are subsequently used as print, a reaction of the surface coating can also take place subsequently, in that additives activatable by microwaves, heat, plasma, UV light or magnetic fields are first applied as coating, and during the subsequent use as print these are appropriately activated in a following step: a particularly advantageous reaction occurs on the surface of the extruded strands, and in particular can also be utilized for the crosslinking of the strands to one another. However, this subsequent crosslinking can also be brought about within the former filaments by diffusion or by an additional dynamic or static mixer unit, already described above, in the region of the printing head in which the molten filament is present.

In an alternative embodiment, the additives from various feed containers may themselves react with one another after the mixing process and thus by way of example give chemical crosslinking at the filament surface and/or improve the adhesion that the filaments downstream of the printing process exhibit towards one another.

The feed containers may comprise conventional moveable cartridges for color printing for 2D color ink-jet printers, or involve feed vessels from which liquids are removed by pumping, or involve cartridges which can be clamped into a reciprocating pump. The design of these may be such that they can be replaced or renewed simply and individually.

The present invention also provides a novel, extrusion-based 3D color print process which comprises the following operations:

Coating of a continuously transported filament with additive compositions and/or with dye compositions, fixing of the additive composition and/or dye composition on the surface of the filament, removal of the coated filament and optional storage or packaging for subsequent use as print in an extrusion-based 3D printer. In this, the material is introduced into the printing head, the filament is melted in the said printing head, and output of the melt is achieved by a nozzle for the purpose of three-dimensional printing.

A feature of the claimed process preferably includes the element that down-stream of the subsequent printing process the coating constituents have accumulated on the surface of the strand.

In one particular embodiment of the claimed process, the coating process may be conducted in-line directly downstream of the extrusion process for the production of the filament. In this particular embodiment, the production and the coating thus take place in one process. This embodiment may be particularly suitable for the coating process already described above using coextrusion.

In another alternative of the claimed process, in which finished filaments are coated, these are preferably provided on rolls and downstream of the claimed coating process are wound up onto other rolls.

In another possible embodiment of the present invention, the filament may not be coated uniformly but instead, for example may be coated with varying colors. It is thus possible firstly to produce particular color effects in the three-dimensional object finally produced and secondly to deposit, on the filament, a succession of colors which, when the material is subsequently used as print with a corresponding print file, gives a specifically colored multicolor object. In this type of procedure, it may be possible that, the colored filaments are marketed together with a corresponding means of data storage.

The present invention equally also provides the isolated coating device for the production of coated filaments for use in extrusion-based 3D printers, composed of the previously described coating units and fixing units, and suitable for carrying out the claimed process. With this type of isolated coating device, it is possible to coat filaments separately from an extrusion-based 3D printer. The said coated filaments may then be used in extrusion-based 3D printers, and the said printers may also involve printers not according to the invention.

The present invention also provides the roll with a coated filament for use in extrusion-based 3D printers. The said roll carries a filament which has been coated with additives and/or pigments and/or inks.

The present invention equally provides a roll with coated filament for use in extrusion-based 3D printers, where the roll is obtained by the claimed process which is operated with a winder.

The invention claimed is:

1. A process for extrusion-based 3D printing, the process comprising steps of:
    applying a coating composition onto a filament, wherein the filament is comprised of a thermoplastic polymer and the coating composition is comprised of at least one material selected from the group consisting of an additive, a pigment, and an ink;
    fixing the applied coating composition on the filament to obtain a coated filament, the coated filament being comprised of a filament portion and a coating portion on a surface of the filament portion;
    conveying the coated filament to a printing head;
    melting the filament portion of the coated filament in the printing head to obtain a coated melted filament, the coated melted filament being comprised of a melted filament and a coating layer on a surface of the melted filament; and
    extruding a plurality of strands of the coated melted filament onto a substrate to form a three dimensional object, wherein
        the melted filament and the coating layer do not substantially mix during the extrusion of the coated melted filament; and
        the coating layer remains on the surface of the melted filament during the extrusion of the plurality of strands of the coated melted filament.

2. The process according to claim 1, wherein
    the step of applying the coating composition onto the filament is conducted in a coating unit,
    the step of fixing the applied coating composition is conducted in a fixing unit that is downstream of the coating unit and upstream of the printing head, and
    the process further comprises a step of initially producing the coating composition.

3. The process according to claim 2, wherein
    the step of initially producing the coating composition involves a mixing of individual components in a mixer, each of the individual components being supplied to the mixer from a corresponding feed container that is equipped with a metering device; and the process further comprises a step of:
    passing the coating composition, after the initial production thereof, to the coating unit for application onto the filament.

4. The process according to claim 2, further comprising a step of:
    tensioning the filament during the applying and fixing steps, wherein
        the tensioning is achieved by a guide system or a brake, the guide system or the brake being upstream of the coating unit; and
        a conveying unit is optionally located downstream to the fixing unit.

5. The process according to claim 2, wherein the fixing unit is comprised of a thermal drying unit and an optional clearance section downstream of the thermal drying unit, wherein
    the thermal drying unit is comprised of at least one selected from the group consisting of a UV source, an IR source, a plasma source, a heating system, a nozzle for unheated gas or air, and a nozzle for heated gas or air; and
    the optional clearance section is at least 1 cm in length and may optionally be heated.

6. The process according to claim 1, wherein the thermoplastic polymer is at least one selected from the group consisting of an acrylonitrile-butadiene-styrene terpolymer (ABS), a polycarbonate (PC), a poly(meth)acrylate, a polyphenylene sulphone (PPSU), a high density polyethylene (HDPE), a polyetherimide (PEI), a polyether ether ketone (PEEK), and a polylactic acid (PLA).

7. The process according to claim 1, further comprising a step of:
    extruding a secondary filament as a support material during formation of the three dimensional object, wherein the secondary filament is comprised of an acid-soluble, base-soluble, or water-soluble polymer.

8. The process according to claim 1, wherein the process is controlled by a CAD program, the CAD program being comprised of:
    coordinates for the three dimensional object; and information for a desired color shade of the coating composition, wherein
the desired color shade is established via controlled metering of at least one colorant that is used during an initial production of the coating composition, each of the at least one colorant being correspondingly supplied from a feed container that is equipped with a metering device and each color of the at least one colorant being a primary color or black.

9. The process according to claim 1, wherein the coating composition is comprised of an additive that can be activated by microwave, heat, plasma, UV light, or a magnetic field.

10. The process according to claim 1, wherein the coating composition is comprised of at least one adhesion promoter or at least one adhesive and the coating composition is optionally colorless.

11. The process according to claim 1, wherein the step of applying the coating composition onto the filament is conducted in a coating unit, the coating unit being comprised of at least one selected from the group consisting of a nozzle, a microextruder, an annular gap, and a sponge-like material saturated with the coating composition.

12. The process according to claim 11, further comprising a step of:
initially producing the filament via extrusion by an initial extruder unit, wherein the coating unit is directly downstream of the initial extruder unit.

13. The process according to claim 1, further comprising a step of:
winding the coated filament onto a roll, wherein the resulting wound coated filament is later unwound to achieve conveyance of the coated filament to the printing head.

* * * * *